US 8,855,653 B2

(12) United States Patent
Zou et al.

(10) Patent No.: US 8,855,653 B2
(45) Date of Patent: Oct. 7, 2014

(54) METHOD, APPARATUS AND COMPUTER READABLE MEDIUM FOR TRAFFIC REDISTRIBUTION IN WIRELESS NETWORKS

(75) Inventors: Jialin Zou, Randolph, NJ (US); Sudeep Palat, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 103 days.

(21) Appl. No.: 13/552,008

(22) Filed: Jul. 18, 2012

(65) Prior Publication Data

US 2014/0024382 A1 Jan. 23, 2014

(51) Int. Cl.
*H04W 28/08* (2009.01)
(52) U.S. Cl.
USPC ........................................ 455/445; 455/435.3
(58) Field of Classification Search
USPC ............. 455/422.1, 432.1–432.3, 435.1–439, 455/445–453
See application file for complete search history.

(56) References Cited

U.S. PATENT DOCUMENTS

2010/0216469 A1* 8/2010 Yi et al. .................... 455/435.3
2010/0304747 A1* 12/2010 Kazmi et al. ................. 455/436

FOREIGN PATENT DOCUMENTS

WO  WO 2009/057960  5/2009

OTHER PUBLICATIONS

Yuanye Wang et al., "Carrier Load Balancing and Packet Scheduling for Multi-Carrier Systems," IEEE Transactions on Wireless Communications, vol. 9, No. 5, pp. 1780-1789, May 2010.
International Search Report and Written Opinion dated Dec. 20, 2013.
Technical Specification, 3rd Generation Partnership Project; Technical Specification Group Radio Access Network; Evolved Universal Terrestrial Radio Access (E-UTRA); Radio Resource Control (RRC); Protocol specification (Release 9); 3GPP TS 36.331 V9.11.0 (Jun. 2012), Valbonne, France 2012.
Technical Specification, 3rd Generation Partnership Project; Technical Specification Group Radio Access Network; Evolved Universal Terrestrial Radio Access (E-UTRA); Radio Resource Control (RRC); User Equipment (UE) procedures in idle mode (Release 9); 3GPP TS 36.304 V9.11.0 (Jun. 2012); Valbonne, France, 2012.

* cited by examiner

*Primary Examiner* — Kashif Siddiqui
(74) *Attorney, Agent, or Firm* — Harness, Dickey & Pierce

(57) ABSTRACT

The apparatus includes a processor. The processor is configured to determine whether to redistribute traffic, generate a message upon determining traffic is to be redistributed, the message including cell priority values, the cell priority values including a priority value for each of a plurality of carriers, and transmit the message to the one or more user equipment.

20 Claims, 9 Drawing Sheets

METHOD, APPARATUS AND COMPUTER READABLE MEDIUM FOR TRAFFIC REDISTRIBUTION IN WIRELESS NETWORKS

BACKGROUND OF THE INVENTION

1. Field

Embodiments relate to associating user equipment (UE) with multiple carriers in a wireless network.

2. Related Art

With more and more UEs being in use (especially more and more smart phones being in service), access rejections are observed in the field due to the overload of a specific carrier in a multi-carrier deployment. The situation may be largely mitigated if the load over multiple carriers is balanced. Load balance among the multiple carriers is typically a system design goal. Especially, when non-contiguous spectrum with multi-carriers of different bandwidth is involved, different areas may be covered by different numbers of carriers of different bands. Balanced load among the carriers is important in order to allow a more efficient utilization of the available spectrum resource. Furthermore, a common scenario is that UE density is different at different areas and multiple carriers could be deployed at hot spots with high mobile density; in most areas with normal user density, fewer carriers would be employed than at the hot spots.

Heterogeneous wireless networks (HetNets) are deployments of cells with differing coverage radii within a single geographic area. A typical configuration is one where macro (e.g., large) cells provide contiguous coverage over the area while pico, femto or metro (e.g., small) cells cover smaller areas that are associated with either traffic hot spots or coverage holes. Operators may deploy small cells with different carriers at hot spots within the coverage of a macro cell. When UEs move from a normal area into the hot spots with more carriers, UE traffic is split and the load balanced among the macro and small cell carriers at the hot spots.

SUMMARY OF THE INVENTION

One embodiment includes a network entity. The network entity includes a processor. The processer is configured to determine whether to redistribute traffic, generate a message upon determining traffic is to be redistributed, the message including cell priority values, the cell priority values including a priority value for each of the plurality of carriers, and transmit the message to the one or more user equipment.

Another embodiment includes a network entity. The network entity includes a processor. The processer is configured to determine whether to redistribute traffic, generate a reselection message upon determining traffic is to be redistributed, the reselection message including a set of cell probability values, the set of cell probability values including a probability value for each of the plurality of carriers, and transmit the reselection message to the one or more user equipment.

Another embodiment includes a wireless user equipment. The wireless user equipment includes a processor. The processor is configured to determine whether the user equipment is in an idle mode, generate a random priority value upon determining the user equipment is in an idle mode, the random priority value being based on a range of carrier reselection priority values, and reselect a carrier for the user equipment based on the random priority value.

Another embodiment includes a wireless user equipment. The wireless user equipment includes a processor. The processor is configured to receive a reselection message including one of a set of cell priority values and a set of cell probability values, and to reselect a carrier for the user equipment based on one of the set of cell priority values and the set of cell probability values.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of example embodiments and wherein.

Figure 1A:
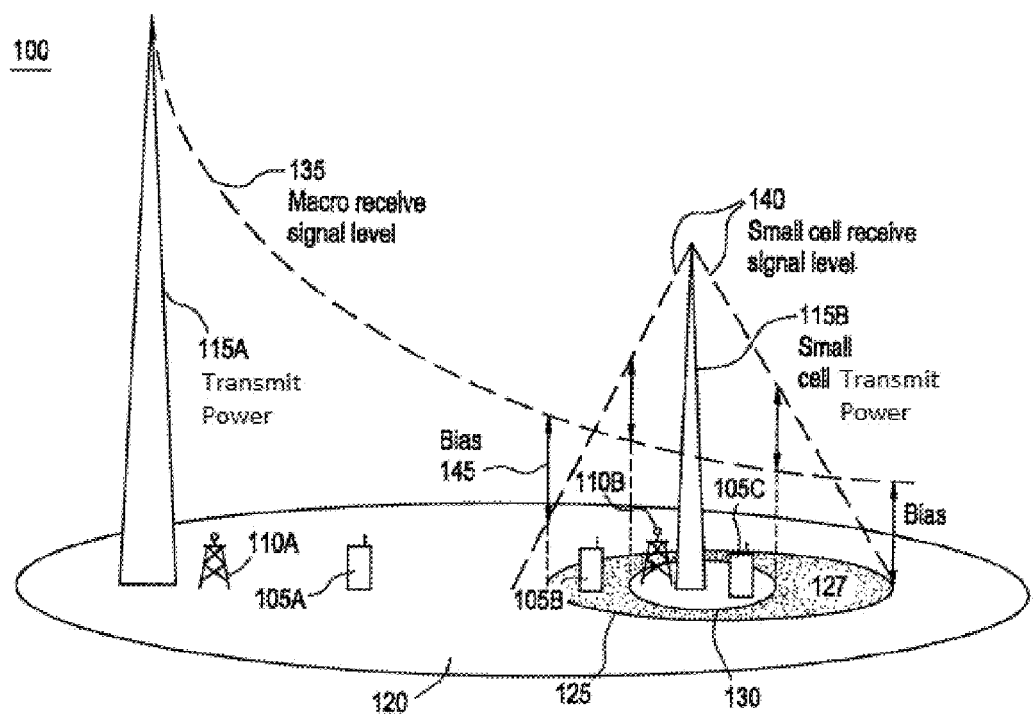
FIG. 1A is a diagram illustrating a portion of a heterogeneous wireless communications network according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Overview of Network Architecture

FIG. 1A illustrates a portion of a wireless communications network 100. Referring to FIG. 1A, wireless communications network 100 may follow, for example, a Long Term Evolution (LTE) protocol. Communications network 100 includes a macro base station (BS) 110A; a small cell BS 110B; a macro cell 120, a small cell 125; and first through third UEs 105A-C. The small cell 125 may be, for example a pico cell, a femto cell or a metro cell. Further, the term small cell as used herein may be considered synonymous to and/or referred to as pico cell, a femto cell or a metro cell. Multiple carriers are used by the macro and small cells.

In the example illustrated in FIG. 1A, the first UE 105A is attached to the macro cell 120, and the second and third UEs 105B and 105C are attached to the small cell 125 with a different frequency carrier from the macro cell Though, for the purpose of simplicity, communications network 110 is illustrated as having only macro BS 110A, small cell BSs 110B, and first through third UEs 105A-C, communications network 100 may have any number of macro BSs, small cell BSs and UEs. Further, the macro BS 110A and small cell BS 110B may be connected to other core network elements included in the communications network 100 including, for example, one or more mobility management entities (MME) and/or one or more operations, administration and management (OAM) nodes (not shown). Further, the MME may include the OAM node.

The macro BS 110 may be, for example, an evolved nodeB (eNB) providing wireless coverage for UEs within the macro cell 120. The small cell BS 110B may be, for example, an eNB underlaid with respect to the macro BS 110A. The small cell BS 110B may provide wireless coverage for UEs associated with the small cell 125 that supplements coverage provided by the macro BS 110A. Data, control signals and other information described herein as being sent and/or received by the macro cell 120 may be sent and/or received by the macro BS 110A. Further, operations described herein as being performed by the macro cell 120 may be performed by the macro BS 110A. Data, control signals and other information described herein as being sent and/or received by the small cell 120 may be sent and/or received by the small cell BS 110B. Further, operations described herein as being performed by the small cell 125 may be performed by the small cell BS 110B.

In general a transmit power of the macro BS 110A may be greater than a transmit power of the small cell BS 110B. Transmit powers 115A and 115B illustrate an example of the relative transmit powers of the macro BS 110A and the small cell BS 110B, respectively. Macro receive signal level 135 illustrates an example of a strength of a receive signal of the macro cell 120 measured by UEs within communications network 100. As is illustrated in FIG. 1A, in general, the strength of the macro receive signal level may drop as a distance from a location of the macro BS 110A increases. Small cell receive signal level 140 illustrates an example of a strength of a receive signal of the small cell 125 measured by UEs within communications network 100.

As one skilled in the art will appreciate (and indicated above), a small cell may be a pico, micro or metro cell. For example, a metro cell may imply an Open Subscriber Group (OSG) small cell(s), in that subscribers (e.g., a user of a UE) with valid subscriptions with an operator may (a) freely roam into the coverage area of a metro small cell and register with the network, if they are not already in a call. This procedure is typically called a cell (re)selection procedure, and may (b) establish a traffic connection to the metro small cell if the subscribers are already in a call, a procedure called handover.

Therefore, there may be an implicit association between a metro cell and the OSG and an implicit association between femto and Closed Subscriber Group (CSG). In CSG, femto cells may include a selected group of subscribers that can perform cell (re)selection and handover procedures to/from the femto cell. Example embodiments are applicable to OSG, CSG and any arrangement in between such as a Hybrid Access (HA) where in between the two extremes, access policies may be established by the mobile operator.

As one skilled in the art will appreciate, a BS may be a logical entity that incorporates transmitter and receiver functionality. Therefore, a base station may be physically embodied as a group of remote RF transmitting and receiving antennas. Each antenna may have an associated remote radio head (RRH). The logical entity may include a RRH centralized baseband cage (typically remote to the antenna). Example embodiments may be implemented in other physical arrangements familiar to those skilled in the art. A physical transmitting antenna may correspond to one or more coverage cells. Therefore a logical BS may be associated with more than one cell. The terms bases station (BS) and RRH may be used interchangeably in the descriptions below.

Figure 1B:
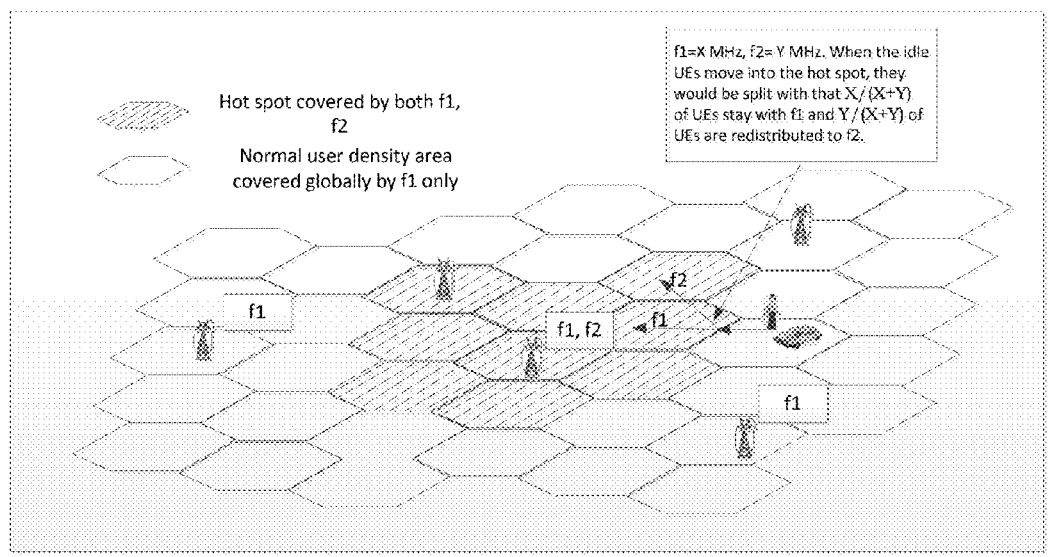
FIG. 1B is a diagram illustrating an macro cellular network with a global coverage carrier and multiple carriers at the hotspot area.

FIG. 1B is a diagram illustrating a portion of a wireless communications network including only macro cells (e.g., macro cell 120). As is shown in FIG. 1B, macro cells may service UEs using carrier frequency f1 at X MHz (e.g., 5 MHz). As is further shown in FIG. 1B, a plurality of carriers are enabled at multiple macro cells, which cover the specific area with high density of UEs and high traffic load (as a "hot spot"). In this example, carrier frequency f1 at X MHz (e.g., 5 MHz) and carrier frequency f2 at Y MHz (e.g., 10 MHz) are enabled. Maintaining a first portion (e.g., ⅓) of the UEs with f1 and a second portion (e.g., ⅔) of the UEs reselected to f2 may be desirable based on the spectrum bandwidth of carrier frequencies f1 and f2.

General Explanation of Access Rejections and Traffic Loading

Access rejections may be observed in the field due to the overload of a specific carrier in a multi-carrier deployment. However, the rejections may be a passive action after the damage of service delay or service outage has already taken place. Access rejections may be mitigated if the load over multiple carriers is balanced. Load balance among the multiple carriers is typically a system design goal. For example, when non-contiguous spectrum with multi-carriers of different bandwidth is involved, different areas may be covered by different numbers of carriers of different frequency bands. Generally, balanced load among the carriers allows efficient utilization of the available spectrum resource. Furthermore, as shown in FIG. 1B, UE density may vary at different areas and multiple carriers may be deployed at the hot spots with high UE density, while in areas with normal UE density, fewer carriers would be employed. When UEs move from the normal area into the hot spots with more carriers, redistributing the UE traffic and having balanced load among the carriers at the hot spots may be necessary.

Explanation of Controlling Idle Traffic Loading

Active UE traffic load is known to correlate with the idle UE density. Current traffic model studies indicate that the ratio of the number of active UEs versus idle UEs is a statistically fixed value. Therefore, access load is directly associated with the idle UE density, and the access load is known to be good metric of the idle UE density. Accordingly, in example embodiments, access load may be used for measuring the idle UE density and performing the idle UE re-distribution.

When there is active traffic overload and/or access overload, if only the access barring or active traffic redirection is performed, the overload situation may be persistent because there may be more idle UEs waking up. This may lead to continuously activating the overload control mechanism to perform access barring and active traffic redirection. As a result, resources may be wasted for the overload control operations, service delay may be introduced by access barring and the chance of service interruption may also increase. Therefore, redistributing idle UEs when active traffic overload and/or access overload has occurred or may occur is desirable. By proactively controlling the idle traffic load distribution, the chance of active traffic overload and access overload may be minimized.

In LTE standards (e.g., 3GPP TS 36.331 v.9.0 and 3GPP TS 36.304 v.9.0), per carrier priority value is used to control the idle traffic loading among multiple cells, multiple frequency carriers or different Radio Access Technologies (RATS) (hereinafter collectively referred to as carriers). However, the current priority based reselection method is an on/off traffic control approach. If the priority value of the target carrier is higher than the priority value of current serving carrier, all the idle UEs on the serving carrier will reselect to the target carrier so long as the target carrier's link condition is of sufficient quality. Otherwise, all the idle UEs will stay with the serving carrier.

While the aforementioned LTE standards provide the basic redistribution function for inter-carrier cases and where the number of frequency layers are small, loading control using the on/off traffic control approach becomes insufficient when the number of frequency layers increases as with a more and more multi-carrier use case such as Carrier Aggregation in HetNet. The current on/off loading control may not achieve a smooth load balance among the carriers. In the case of more than two carriers, most idle UEs of all the carriers with lower priorities will reselect to the carrier with the highest priority. Priority adjustment may cause loading swings and loading surges among the carriers.

Another possible solution supported by the aforementioned LTE standards is to use a dedicated priority for load balancing of idle traffic. However, for multi-carrier operation scenarios such as Carrier Aggregation where several LTE carriers are available, load balancing requires different percentages of traffic to stay with a given carrier or to move to a different carrier depending on the load on that carrier. Because traffic load could change over time or location, and the number of carriers could also be different at different coverage areas, for a moving (e.g., transitioning between cells) idle UE, this traffic re-distribution ratio (percentage) would need to be changed dynamically as the load or number of carriers varies over time.

However, dedicated priorities can only be assigned at the time a UE goes idle from the 'connected' state. Therefore, using a dedicated priority for load balancing of idle traffic may not be sufficient to control a large number of UEs in an overloaded cell.

If the dedicated priority were to be used to balance the load between carriers, the method may need to be changed to meet dynamic load balancing requirements. For example, for Evolved Universal Terrestrial Radio Access Network (UT-RAN) (E-UTRAN) to change the dedicated priority for idle mobiles, the E-UTRAN would need to page the idle UE and the idle UE must switch to connected mode to update the dedicated priorities. Further, dedicated priorities are typically set for a specific group of users and are not changed often. Therefore, dedicated priorities may not be sufficient for systems that require a dynamic priority value change for a moving idle UE.

General Methodology

According to example embodiments, the UE cross carrier reselection procedures and supporting signaling are modified such that the idle UEs reselect to a target carrier based on a probabilistic method. For example, the UE may randomly assign a priority to itself and reselect based on the random priority assignment. Alternatively, a network entity may assign carriers a random priority or probability and instruct the UE to reselect based on the random priority or probability assignment. By controlling the reselection probability of every UE in a serving cell, the network may control a percentage of idle UEs to reselect to a target carrier.

Example Implementations

User Equipment Initiated Traffic Redistribution

The existing priority based idle UE cross carrier reselection mechanism in aforementioned LTE standard may be leveraged as much as is possible. For example, in an example embodiment, UEs may not be assigned an Absolute Priority by the Radio Access Network (RAN). Instead, the UE will generate a UEReselectionPriority by itself whenever the read/decoded Serving CellReselectionPriority in System Information Block (SIB) Message (e.g., SIB3) is triggered. For example, the UE may randomly generate a UEReselectionPriority internally. The UEReselectionPriority is uniformly distributed between the entire range of the supported CellReselectionPriority values, (e.g., 0 to 7). As a result, the UEs may be evenly distributed into groups with associated priority values (e.g., eight (8) groups). In other embodiments, UEs may be distributed into any number of groups with corresponding range of priority values.

Alternatively, UEs may be classified into different groups by processes that include: (1) pre-configuring UEs into different priority groups by the operators; and (2) randomly grouping based on the UE's ID (e.g. International Mobile Subscriber Identity (IMSI)). For example, if a UE's URP= (IMSI) modulo 8, the UEs may be evenly distributed into 8 priority groups.

Figure 2:
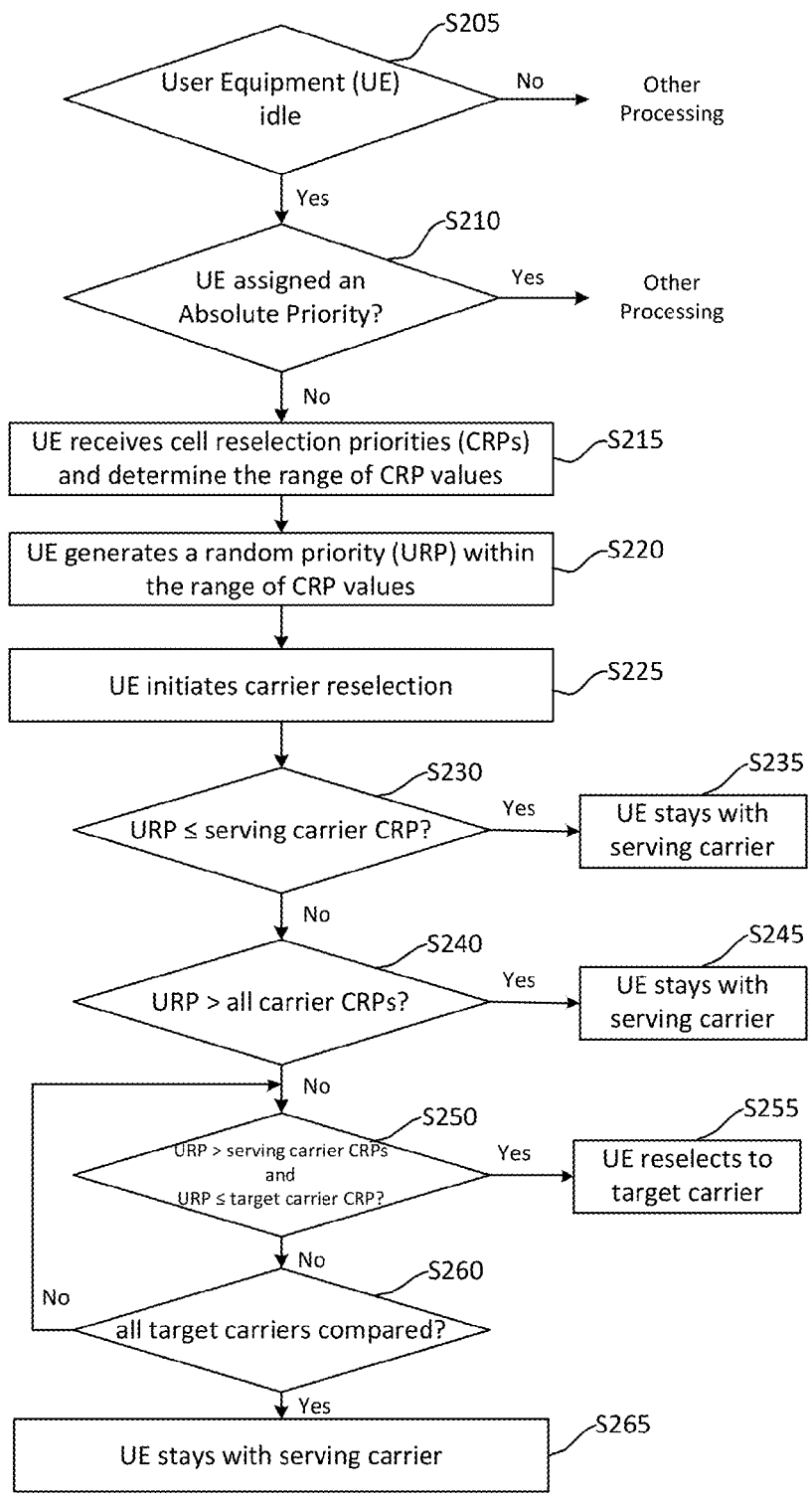
FIG. 2 illustrates a method for traffic redistribution by user equipment according to an example embodiment.

FIG. 2 illustrates a method for traffic redistribution by UE according to an example embodiment. While describing the steps of the method associated with FIG. 2, reference will be made to the wireless network 100 of FIG. 1A. In the method associated with FIG. 2, the UE may include a processor and a memory which operate together to run UE functionality. For example, the memory may store code segments regarding apparatus functions. The code segments may in-turn be executed by the processor. Further, the memory may store process variables and constants for use by the processor.

In step S205 the UE 105 determines if the UE 105 is in an idle mode. The UE being in an idle mode is known to those skilled in the art. For example, a UE (e.g., UE 105) is connected (e.g., RRC_CONNECTED state) when a Radio Resource Control (RRC) connection has been established. Otherwise, the UE is in an idle mode (e.g., RRC_IDLE state). If the UE 105 is in an idle mode, processing continues to step S210. Otherwise some other processing is performed for the connected UE.

In step S210 the UE 105 determines if the UE 105 is assigned an absolute priority. For example, the UE 105 may include a stored parameter value indicating absolute priority is set. The UE 105 may determine if the UE 105 is assigned an absolute priority based on a value of this stored parameter. For example, according to the aforementioned LTE standards, the parameter may be cellReselectionPriority for an E-UTRAN frequency or a UTRAN frequency or group of Global System for Mobile Communications (GSM) EDGE Radio Access Network (GERAN) frequencies or a Code division multiple access (CDMA) frequency. If the UE 105 is not assigned an absolute priority, processing continues to step S215. Otherwise some other processing is performed for the absolute priority UE.

In step S215 the UE 105 determines a range of carrier priority (CRP) values. For example, in the aforementioned LTE standards, the range of the CRP values is pre-specified and is represented by 3 bits. Therefore, the range of CRP is from 0-7. The UE 105 may read the Cell Reselection Priorities (CRPs) in the System Information Blocks (SIBs) regularly broadcast by the BS 110A to determine the range of carrier priority (CRP) values. Therefore, as discussed above, if there are 8 available carriers, the UE 105 may select integer values in the range of 0-7. In order to improve the resolution of idle traffic redistribution, the standards may be enhanced to add more bits to CRP.

In step S220 the UE 105 generates a random priority (URP) value within the range of CRP values. For example, the UE 105 may generate a random integer number between 0 and 7 (using any known algorithm) and set the URP equal to this random integer value.

In step S225 the UE 105 initiates carrier reselection. For example, the UE 105 may initiate carrier reselection based on a message received from the network. Alternatively, or in addition, the UE 105 may initiate carrier reselection in regular time intervals (e.g., based on a timer).

In step S230 the UE 105 determines if the URP is less than or equal to the serving carrier CRP. For example, the UE 105 may compare the value of the random integer number set as the URP to the CRP assigned to the serving carrier. If the URP is less than or equal to the serving carrier CRP, in step S235, the UE 105 remains associated with the serving carrier. Otherwise, processing continues to step S240.

In step S240 the UE 105 determines if the URP is greater than all carrier CRP's. For example, the UE 105 may determine a maximum CRP value amongst the available target carriers. The UE 105 may compare the value of the random integer number set as the URP to the maximum CRP. If the URP is greater than all carrier CRP's, in step S245, the UE 105 remains associated with the serving carrier. Otherwise, processing continues to step S250.

In step S250 the UE 105 determines if the URP is greater than the serving carrier CRP and if the URP is less than or equal to a target carrier CRP. For example, if there is more than one potential target carrier, the comparison operation is started from the carrier with the lowest CRP and then follows in order from low to high CRP to perform the comparison. For example, the UE 105 may select a carrier with the lowest CRP from a list of candidate target carriers whose CRPs have not been compared with the URP yet as a potential reselection target carrier. The UE 105 may compare the value of the random integer number set as the URP to the determined CRP of the target carrier. If the URP is greater than the serving carrier CRP and if the URP is less than or equal to a target carrier CRP, in step S255, the UE 105 reselects to the target carrier. Otherwise, processing continues to step S260.

In step S260 the UE 105 determines if all target carriers have been compared for reselection. For example, the UE 105 may determine if each carrier in the list of target carriers has been selected and compared as a potential carrier. If all target carriers have been compared for reselection, in step S265, the UE 105 remains associated with the serving carrier. Otherwise, processing returns to step S250.

Further, if a carrier frequency is not assigned a priority value, the UEs may treat the carrier as if the carrier has the lowest priority which is even lower than the 0 priority value. This characteristic can be used in situations where the network's objective is to redirect/clean-up all the idle UEs assigned to a carrier.

Figure 6:
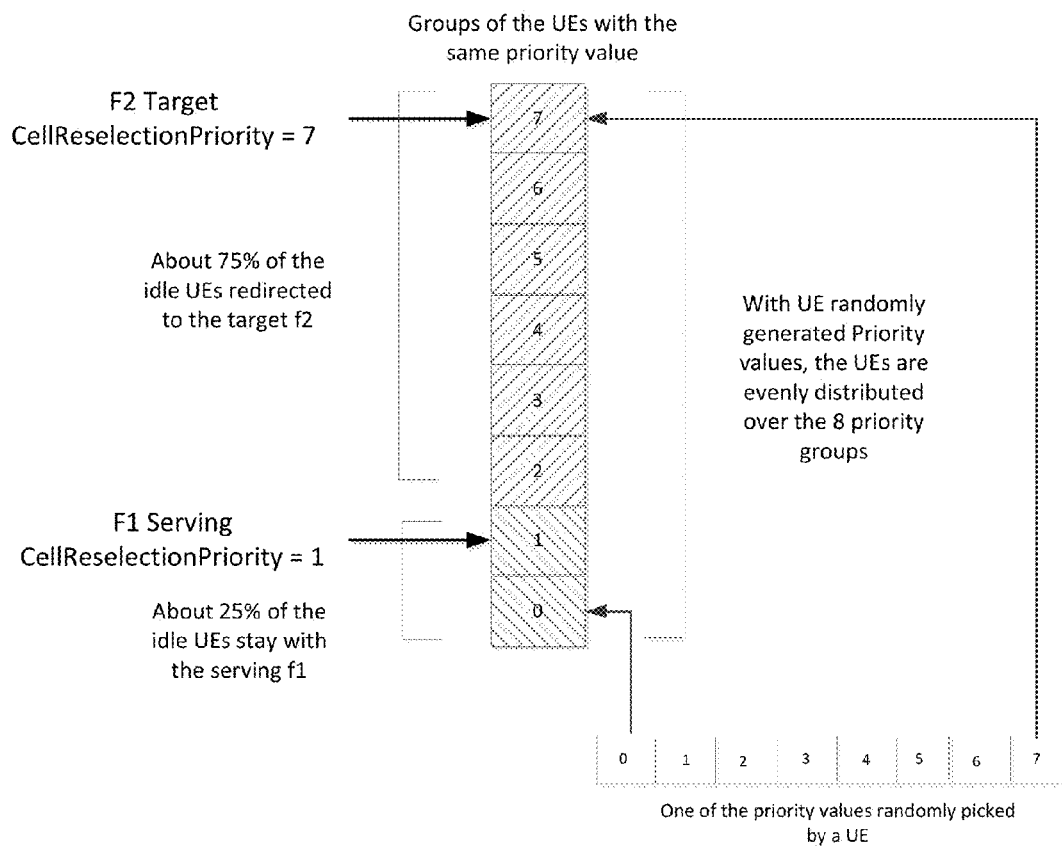
FIG. 6 illustrates traffic redistribution according to an example embodiment.

FIG. 6 illustrates how the portion of idle UEs associated with one carrier are redistributed to another carrier. Upon a UE determining to reselect to a new serving cell or SIB information being updated, the UE may read the reselection information in SIBs (e.g. SIB3 and SIB5) and randomly generate a URP. As a result, ⅛ of the UEs reading the SIB will have the same priority value from 0 to 7 respectively. Therefore the UEs are evenly distributed over 8 priority groups. SIB's are known to those skilled in the art. Generally, SIB's contain system information of the same nature. There are eighteen SIB's. SIB3 includes information associated with cell selection and reselection parameters for the serving cell. SIB3 also contains cell access restriction information for the current cell. SIB3 information is used by the Radio Resource Controller (RRC) for a UE in idle mode.

If the serving carrier broadcasts its own priority as 1 while other overlapped carrier's priority is set to 7, based on the reselection rule described with respect to FIG. 2, the UEs with the priority value equal or less than Serving CellReselctionPriority=1 will stay with the serving carrier. Those are the UEs in the group of URP=0 and 1. The UEs with the priority value higher than the Serving CRP and equal or lower than the target carrier CRP, may reselect to the target carrier. Those are the UEs in the groups with the URP=2-7.

Therefore 75% of the idle UEs originally associated with the serving carrier (e.g., F1) are redirected to the target carrier (e.g., F2) and 25% of the idle UEs stay with the serving carrier. If the priority values remain unchanged, the existing UEs on a carrier will stay with the carrier. When a new UE moves into the cell with this new priority setting, the new UE will have a 25% chance of staying with the serving carrier and 75% chance of reselecting to the neighboring carrier F2.

To avoid the perpetual shifting between the carriers, timer based hysteresis and aligned priority setting may be applied on overlapped carriers. For example, after the reselection is performed, a timer is started, and before the timer expires, the UE may not be allowed to reselect back to the original serving carrier. The aligned priority settings basically require the priority values broadcast at both carriers be aligned at the same cell site. For example, if the carrier F1 broadcasts serving CRP=2 and neighboring carrier F2 broadcasts serving CRP=7, it may be required that at least carrier F2 broadcast a serving CRP larger than F1 CRP (e.g., F2 CRP remains at 7).

Network Equipment Initiated Traffic Redistribution

By changing a setting of serving and neighboring CRPs in SIB, the network may effectively control the distribution of idle UEs among the carriers overlapping a coverage area. The aforementioned LTE standards limit the SIB update frequency to 32 times every 3 hours. Therefore, if evenly distributed, the priority may be updated, at most, once every 5.6 minutes. For most cases, the priority setting in SIBs may be stable, even for the un-even idle UE re-distribution at the coverage edges, because of the long time between updates. However, the network equipment may select update of system information blocks or using a reselection message based on one or more of an access load and a traffic load depending on a timing of a needed redistribution (e.g., greater than or less than 5.6 minutes).

Network Entity Operation for CRP Update by Broadcast Paging

The network entity may determine the idle traffic load on a plurality of carriers. If the access load or traffic load on any one of the carriers is above a threshold, the network entity may determine redistribution of traffic is desired. Alternatively, or in addition, if the traffic load difference between two or more of the carriers is above a threshold, the network entity may determine redistribution of traffic is desirable.

For example, according to an example embodiment, an enhancement to the priority based redistribution method for responsiveness to loading surge may be provided. When an overload is detected by the network, instead of waiting for a lengthy period of time (e.g., more than 5 minutes) to adjust the priority broadcast in the SIB to redistribute the idle UEs, the updated CRPs of the serving and neighboring cells may be delivered to the UEs by a broadcast paging message for idle UE redistribution. A known broadcast paging mechanism is used to communicate the message. The broadcast paging message may include a set of cell priority values.

The CRPs are updated by the network based on the load re-distribution requirement. The CRP values are determined based on the method described above with regard to FIG. 2. However, instead of the UE (e.g., UE 105) performing the steps of FIG. 2, a network entity performs the steps of FIG. 2 (e.g., base station 110) and will lead to percentages of idle UE being redistributed among different carriers.

User Equipment Operation Based on Network Entity Assigned Priority

Figure 3:
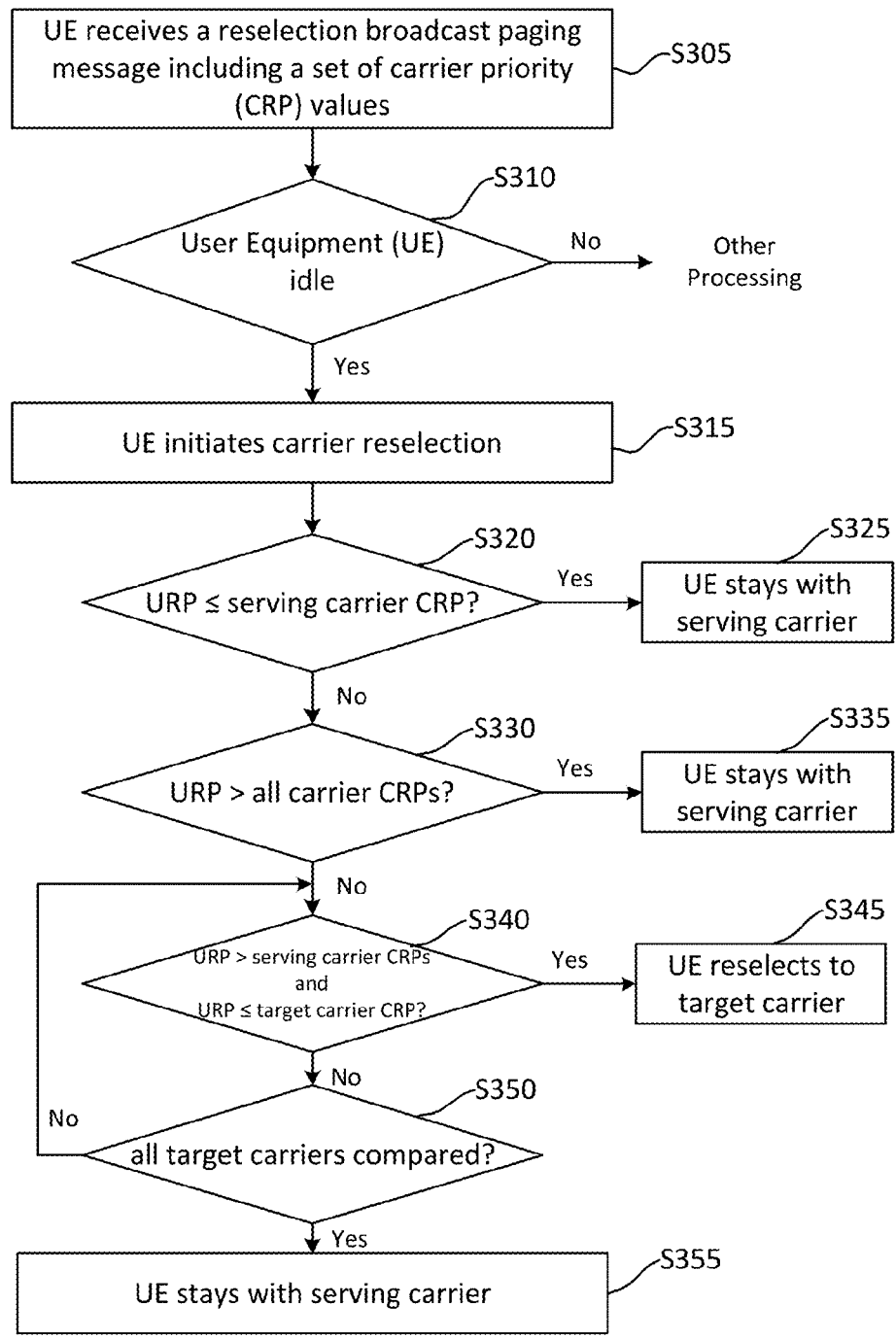
FIG. 3 illustrates a method for traffic redistribution by user equipment according to an example embodiment.

FIG. 3 illustrates a method for traffic redistribution by UE according to an example embodiment. While describing the steps of the method associated with FIG. 3, reference will be made to the wireless network 100 of FIG. 1A. In the method associated with FIG. 3, the UE may include a processor and a memory which operate together to run UE functionality. For example, the memory may store code segments regarding apparatus functions. The code segments may in-turn be executed by the processor. Further, the memory may store process variables and constants for use by the processor.

In step S305 the UE 105 receives a broadcast message. For example, the broadcast message may be the broadcast paging message described above (e.g., re-selection message). The message may include a set of cell priority values associated with different frequency carriers. Alternatively, the UE 105 may receive one or more messages including an update of system information blocks (SIB). The updated SIB blocks may include updated cell priority values. The UE 105 may read the Cell Reselection Priorities (CRPs) in the System Information Blocks (SIBs) to determine the range of carrier priority (CRP) values (e.g., priority values associated with different frequency carriers).

In step S310 the UE 105 determines if the UE 105 is in an idle mode. A UE being in an idle mode is known to those skilled in the art. For example, a UE (e.g., UE 105) is connected (e.g., RRC_CONNECTED state) when an RRC connection has been established. Otherwise, the UE is in an idle mode (e.g., RRC_IDLE state).

In step S315 the UE 105 initiates carrier reselection after determining the UE is idle. For example, the UE 105 may initiate carrier reselection based on the message received from the network being a reselection message.

In step S320 the UE 105 determines if the URP is less than or equal to the serving carrier CRP. For example, the UE 105 may compare the value of a URP assigned to the UE to the CRP assigned to the serving carrier as read from the set of cell priority values received in the message. If the URP is less than or equal to the serving carrier CRP, in step S325, the UE 105 remains associated with the serving carrier. Otherwise, processing continues to step S330.

In step S330 the UE 105 determines if the URP is greater than all carrier CRP's. For example, the UE 105 may determine a maximum CRP value amongst the available target carriers based on the set of cell priority values received in the message. The UE 105 may compare the URP assigned to the UE to the maximum CRP. If the URP is greater than all carrier CRP's, in step S335, the UE 105 remains associated with the serving carrier. Otherwise, processing continues to step S340.

In step S340 the UE 105 determines if the URP is greater than the serving carrier CRP and if the URP is less than or equal to a target carrier CRP. If there is more than one potential target carrier, the comparison operation may start from the carrier with the lowest CRP and then be performed in order from low to high CRP. For example, the UE 105 may select a carrier with the lowest CRP from a list of candidate target carriers whose CRPs have not been compared with the URP yet as a potential reselection target carrier. The UE 105 may determine a CRP value associated with the selected target carrier based on the set of cell priority values received in the message. The UE 105 may compare the value of the URP assigned to the UE to the determined CRP of the target carrier. If the URP is greater than the serving carrier CRP and if the URP is less than or equal to a target carrier CRP, in step S345, the UE 105 reselects to the target carrier. Otherwise, processing continues to step S350.

In step S350 the UE 105 determines if all target carriers have been compared for reselection. For example, the UE 105 may determine if each carrier in the list of target carriers has been selected and compared as a potential carrier. If all target carriers have been compared for reselection, in step S355, the UE 105 remains associated with the serving carrier. Otherwise, processing returns to step S340.

Network Entity Operation for Reselection Probability Carried by Broadcast Paging to the UEs The network entity may determine the idle traffic load on a plurality of carriers. If the idle traffic load on any one of the carriers is above a threshold, the network entity may determine redistribution of traffic is desired. Alternatively, or in addition, if the idle traffic load difference between two or more of the carriers is above a threshold, the network entity may determine redistribution of traffic is desired.

Another example embodiment may be to develop and separate a re-distribution method independent of the priority based reselection mechanism (described above). For example, a broadcast paging mechanism may be used to broadcast a reselection message to the UEs. The message may include the reselection probabilities associated with all the neighboring carriers.

Figure 4:
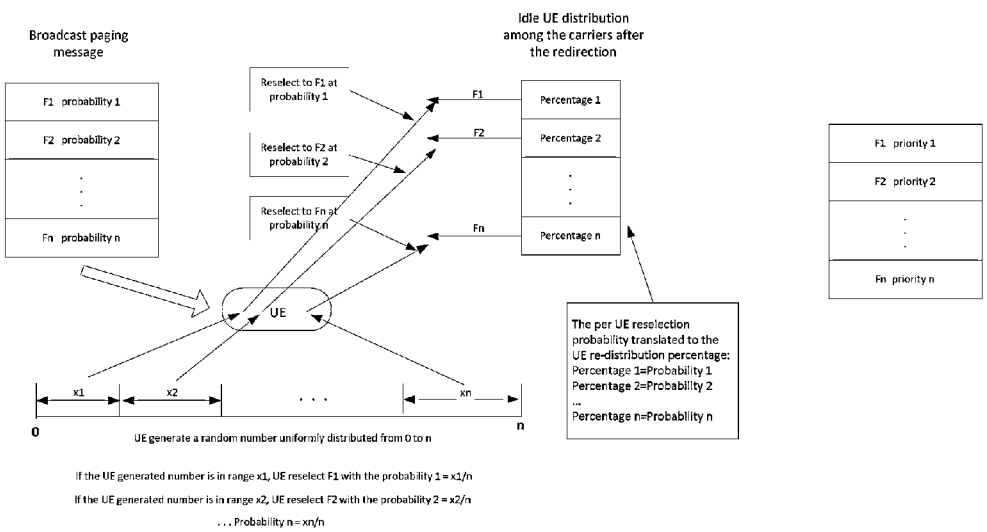
FIG. 4 illustrates mechanism a network entity uses to broadcast reselection probabilities according to an example embodiment.

The probabilities may be determined by the network based on the load re-distribution requirement. FIG. 4 illustrates a mechanism a network entity uses to broadcast reselection probabilities according to an example embodiment. The broadcast of reselection probabilities may result in a percentage of idle UE redistribution among different carriers. After the UE receives the reselection probabilities, p1, p2, . . . , pn, associated with the neighboring carriers, f1, f2, . . . , fn, the UE (e.g., UE 105) will generate a random number which is uniformly distributed between a total range from 0 to n Based on the reselection probabilities, the entire range (0 μm) may be separated into n sub-ranges with the length of x1, x2, . . . , xn such that p1=x1/n, p2=x2/n, . . . , pn=xn/n. If the random number randomly generated by the UE is in the range of x1, the UE will reselect f1. If the random number randomly generated by the UE is in the range of x2, the UE will reselect f2. If the random number randomly generated by the UE is in the range of xn, the UE will reselect fn. As a result, globally, all the involved UEs are divided into n groups reselected to the n carriers. The reselection probabilities are translated to the percentages of the UEs reselecting to the associated carrier frequencies.

User Equipment Operation Based on Network Entity Assigned Probability

Figure 5:
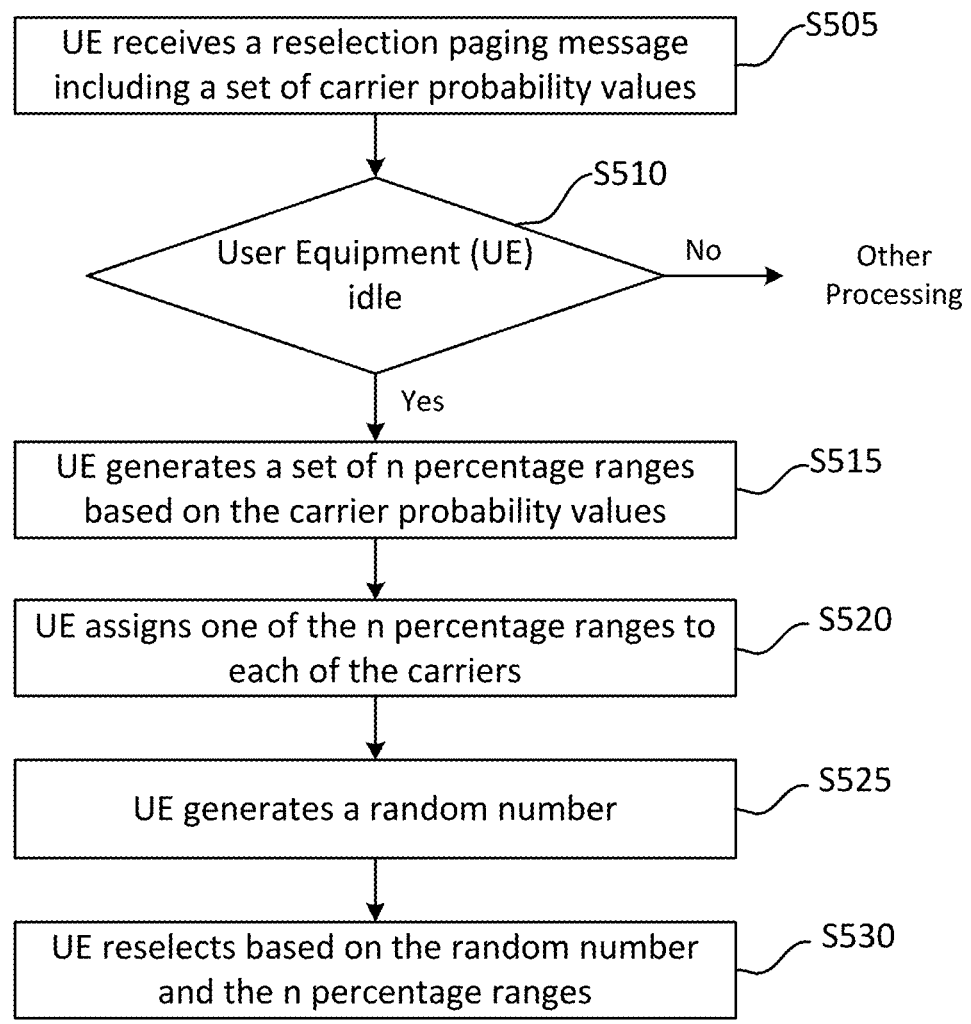
FIG. 5 illustrates a method for traffic redistribution by user equipment according to an example embodiment.

FIG. 5 illustrates a method for traffic redistribution by UE according to an example embodiment. While describing the steps of the method associated with FIG. 5, reference will be made to the wireless network 100 of FIG. 1A. In the method associated with FIG. 5, the UE may include a processor and a memory which operate together to run UE functionality. For example, the memory may store code segments regarding apparatus functions. The code segments may in-turn be executed by the processor. Further, the memory may store process variables and constants for use by the processor.

In step S505 the UE 105 receives a reselection paging message. For example, the reselection broadcast message may be the message transmitted in step S350 described above. The message may include a set of cell reselection probability values associated with the neighboring carrier frequencies.

In step S510 the UE 105 determines if the UE 105 is in an idle mode. UE being in an idle mode is known to those skilled in the art. For example, a UE (e.g., UE 105) is connected (e.g., RRC_CONNECTED state) when an RRC connection has been established. Otherwise, the UE is in an idle mode (e.g., RRC_IDLE state).

In step S515 the UE 105 generates n percentage ranges based on the carrier probability values (n equal to the number of carriers). For example, the entire percentage range may be 1-100%. As discussed above, an algorithm to generate the probability value based on desired percentages of transfer may have been used. The same algorithm may be used in a reverse manner. For example, the result of using the reverse algorithm may be that UE's reselect to a first carrier 50% of the time, a second carrier 25% of the time and a third carrier 25% of the time. For instance, a first range may include 1-50, a second range may include 51-75 and a third range may include 76-100.

In step S520 the UE 105 assigns one of the n percentage ranges to each of the carriers. For example, the set of cell probability values received in the message may include associated carriers. Each of the carriers may be assigned one of the n ranges based on associated carriers in the received message. For example, the first range including 1-50 may be assigned to carrier1, the second range including 51-75 may be assigned to carrier2 and the third range including 76-100 may be assigned to carrier3.

In step S525 the UE 105 generates a random number. For example, the UE 105 may generate a random integer number between 1 and 100 (using any known algorithm). The random number may be uniformly distributed over the entire percentage range. The UE 105 may store this value in a memory if necessary.

In step S530 the UE 105 reselects a carrier based on the random number and the n percentage ranges. For example, as discussed above, there may be three carriers each with an assigned range. If the random number is between 1 and 50, the UE 105 may reselect carrier1. If the random number is between 51 and 75, the UE 105 may reselect carrier2. If the random number is between 76 and 100, the UE 105 may reselect carrier3.

As one skilled in the art will appreciate there may be more or less than three carriers and the range corresponding to ay carrier may be varied as desired.

Brief Hardware Description

Figure 7:
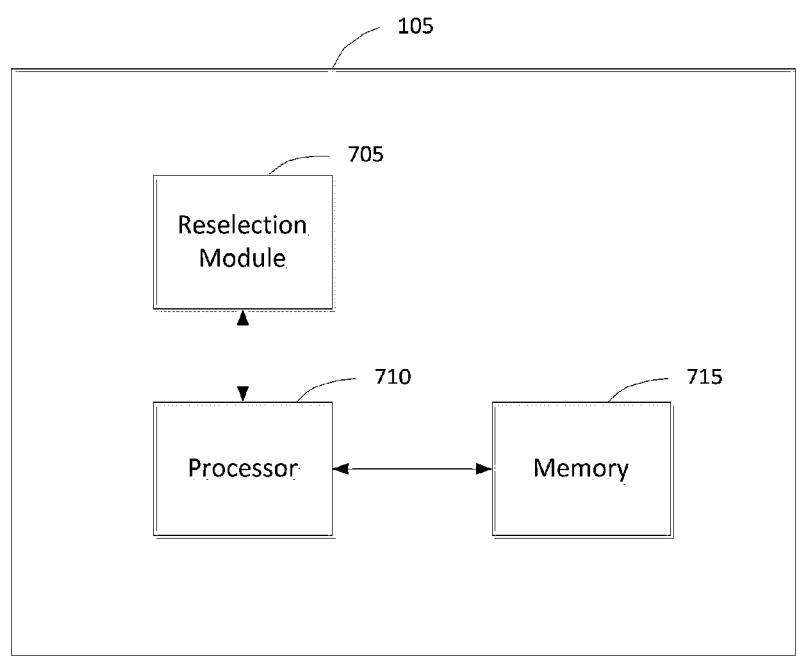
FIG. 7 illustrates a user equipment (UE) according to an example embodiment.

FIG. 7 illustrates a user equipment (UE) according to an example embodiment. As shown in FIG. 7, the UE 105 includes, at least, a reselection module 705, a processor 710 and a memory 715. The processor 710 and the memory 715 operate together to run UE functionality. For example, the memory 715 may store code segments regarding UE functions (e.g., data transfer, control information signaling/handling and the like). The code segments may in-turn be executed by the processor 710. Further, the memory 715 may store process variables and constants for use by the processor 710. Additional details regarding the processor 710 and the memory 715 are known to those skilled in the art and will not be discussed further for the sake of brevity.

The reselection module 705 may be hardware including an additional processor (not shown). For example, the reselection module 705 may be an application specific integrated circuit (ASIC) including self-contained hardware elements (e.g., a processor and a memory) configured to perform reselection functions as, for example software instructions. Alternatively, or in addition to, the reselection module 705 may be a software module configured to co-operate with the processor 710 and the memory 715 in order to execute reselection functions.

The reselection module 305 may be configured to perform carrier reselection as discussed above with regard to FIGS. 2, 3 and 5.

Figure 8:
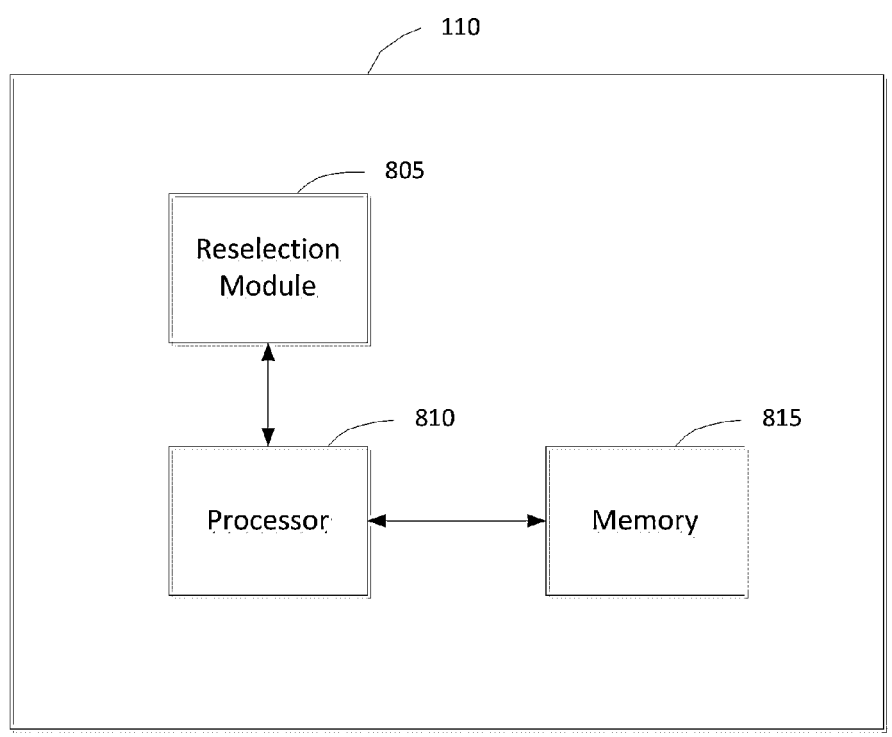
FIG. 8 illustrates an base station according to an example embodiment.

FIG. 8 illustrates a base station (BS) according to an example embodiment. As shown in FIG. 8, the BS 110 includes, at least, a reselection module 805, a processor 810 and a memory 815. The processor 810 and the memory 815 operate together to run BS functionality. For example, the memory 815 may store code segments regarding UE functions (e.g., data transfer, control information signaling/handling and the like). The code segments may in-turn be executed by the processor 810. Further, the memory 815 may store process variables and constants for use by the processor 810. Additional details regarding the processor 810 and the memory 815 are known to those skilled in the art and will not be discussed further for the sake of brevity.

The reselection module 805 may be hardware including an additional processor (not shown). For example, the reselection module 805 may be an application specific integrated circuit (ASIC) including self-contained hardware elements (e.g., a processor and a memory) configured to perform reselection functions as, for example software instructions. Alternatively, or in addition to, the reselection module 805 may be a software module configured to co-operate with the processor 810 and the memory 815 in order to execute reselection functions.

The reselection module 805 may be configured to may be configured to perform carrier reselection as discussed above with regard to FIGS. 2, 3 and 5.

CONCLUSION

Example embodiments provide methods and apparatus to proactively control idle traffic load distribution in order to minimize the chance of active traffic overload and access overload. Accordingly, the methods described above with regard to FIGS. 2-5 may be used alone and/or in combination to proactively control idle traffic load distribution Although the above example embodiments describe the steps as being performed by the network entities illustrated in FIG. 1A (e.g., macro BSs), example embodiments are not limited thereto. For example, the above method steps may be performed by alternative network components.

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

While example embodiments have been particularly shown and described, it will be understood by one of ordinary

We claim:

1. A network entity comprising:
   a processor configured to,
   determine whether to redistribute traffic,
   generate a message upon determining traffic is to be redistributed, the message including cell priority values, the cell priority values including a priority value for each of a plurality of carriers, the cell priority values being based on a probability of reselecting a new carrier, and
   transmit the message to one or more user equipment.

2. The network entity of claim 1, wherein the processor is configured to determine whether to redistribute traffic based on access load and traffic load on one or more of the plurality of carriers.

3. The network entity of claim 2, wherein the processor is configured to determine traffic is to be redistributed when at least one of the access load and the traffic load exceeds a threshold value.

4. The network entity of claim 1, wherein
   the message is one of an update of system information blocks and a reselection message, and
   the processor is further configured to select one of the update of system information blocks and the reselection message based on one or more of the access load and the traffic load.

5. The network entity of claim 1, wherein the message is a reselection paging message and is a broadcast system information message.

6. A network entity comprising:
   a processor configured to,
   determine whether to redistribute traffic,
   generate a reselection message upon determining traffic is to be redistributed, the reselection message including a set of cell probability values, the set of cell probability values including a probability value for each of the plurality of carriers, the cell probability values indicating a probability of reselecting a new carrier, and
   transmit the reselection message to one or more user equipment.

7. The network entity of claim 6, wherein the processor determines whether to redistribute traffic based on traffic load on one or more carriers.

8. The network entity of claim 7, wherein the processor determines to redistribute traffic if the traffic load exceeds a threshold value.

9. A network entity comprising:
   a processor configured to,
   determine whether to redistribute traffic,
   generate a reselection message upon determining traffic is to be redistributed, the reselection message including a set of cell probability values, the set of cell probability values including a probability value for each of the plurality of carriers, the set of cell probability values including an assignment of percentage of user equipment targeted for reselection to each carrier in a wireless network associated with the network entity, and
   transmit the reselection message to the one or more user equipment.

10. The network entity of claim 6, wherein the reselection message is a broadcast paging message.

11. A network entity comprising:
    a processor configured to,
    determine whether to redistribute traffic,
    generate a message upon determining traffic is to be redistributed, the message including cell priority values, the cell priority values including a priority value for each of a plurality of carriers, the cell priority values being randomly generated, and
    transmit the message to one or more user equipment.

12. The network entity of claim 11, wherein the processor is configured to determine whether to redistribute traffic based on access load and traffic load on one or more of the plurality of carriers.

13. The network entity of claim 12, wherein the processor is configured to determine traffic is to be redistributed when at least one of the access load and the traffic load exceeds a threshold value.

14. The network entity of claim 11, wherein
    the message is one of an update of system information blocks and a reselection message, and
    the processor is further configured to select one of the update of system information blocks and the reselection message based on one or more of the access load and the traffic load.

15. The network entity of claim 11, wherein the message is a reselection paging message and is a broadcast system information message.

16. A network entity comprising:
    a processor configured to,
    determine whether to redistribute traffic,
    generate a reselection message upon determining traffic is to be redistributed, the reselection message including a set of cell probability values, the set of cell probability values including a probability value for each of the plurality of carriers, the set of cell probability values being randomly generated, and
    transmit the reselection message to one or more user equipment.

17. The network entity of claim 16, wherein the processor determines whether to redistribute traffic based on traffic load on one or more carriers.

18. The network entity of claim 17, wherein the processor determines to redistribute traffic if the traffic load exceeds a threshold value.

19. The network entity of claim 16, wherein the set of cell probability values include an assignment of percentage of user equipment targeted for reselection to each carrier in a wireless network associated with the network entity.

20. The network entity of claim 16, wherein the reselection message is a broadcast paging message.

* * * * *